US012703376B2

(12) United States Patent
Kyle

(10) Patent No.: US 12,703,376 B2
(45) Date of Patent: Aug. 11, 2026

(54) METHOD AND SYSTEM OF QUANTIFYING AND MANAGING STEERING COMMAND-RESPONSE LATENCY FOR AN AUTONOMOUS VEHICLE

(71) Applicant: GM Global Technology Operations LLC, Detroit, MI (US)

(72) Inventor: Trevor Kyle, Farmington Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/822,976

(22) Filed: Sep. 3, 2024

(65) Prior Publication Data

US 2026/0062017 A1 Mar. 5, 2026

(51) Int. Cl.

*B60W 50/04* (2006.01)
*B60W 40/105* (2012.01)
*B60W 60/00* (2020.01)
*H04L 67/12* (2022.01)

(52) U.S. Cl.

CPC ........ *B60W 50/045* (2013.01); *B60W 40/105* (2013.01); *B60W 60/0025* (2020.02); *H04L 67/12* (2013.01); *B60W 2720/24* (2013.01)

(58) Field of Classification Search

CPC ............. B60W 50/045; B60W 40/105; B60W 60/0025; B60W 2720/24; H04L 67/12
See application file for complete search history.

(56) References Cited

U.S. PATENT DOCUMENTS 11,618,463 B1* 4/2023 Dingli ................ B60W 60/0011 701/29.2
2012/0198105 A1* 8/2012 McKean ............. G06F 11/3485 710/39
2013/0060413 A1* 3/2013 Lee ........................ B62D 1/286 701/23
2016/0330107 A1* 11/2016 Thubert ................ H04W 40/02
2019/0071124 A1* 3/2019 Carter .................. B62D 15/023
2019/0234752 A1* 8/2019 Volos ................. G01C 21/3453
2021/0116907 A1* 4/2021 Altman .................. G05D 1/223
2021/0157325 A1* 5/2021 Beller ................. B60W 60/001
2024/0300543 A1* 9/2024 Rajkumar .............. G05D 1/227

FOREIGN PATENT DOCUMENTS

DE 102010013647 A1 2/2011
DE 112020002604 T5 3/2022

OTHER PUBLICATIONS

Liquid Instruments, "What is cross-correlation, and how does it advance spectrum analysis?" (Year: 2024).*

* cited by examiner

*Primary Examiner* — Stephanie T Su
(74) *Attorney, Agent, or Firm* — Vivacqua Crane, PLLC

(57) ABSTRACT

A method and system of quantifying and managing steering command-response latency for an autonomous vehicle. The system enables the method to determine a lag time between issuing a control command and achieving a commanded angle for a plurality of predetermined vehicle velocities. A predetermined number of lag times are averaged for each of the plurality of predetermined vehicle velocities. The average lag times are weighted in which the more current determined lag times have a higher weight than a less current determined lag time. The averaged time lag is used to improve the response of the vehicle and to detect a health issue in the steering system of the vehicle.

17 Claims, 3 Drawing Sheets

402

| | | $t_0$ | $t_1$ | $t_2$ | $t_3$ | $\mu_j$ |
|---|---|---|---|---|---|---|
| 0 kph | $v_0$ | 80 | 78 | 82 | 80 | 79.8 |
| 10 kph | $v_1$ | 78 | 77 | 69 | 67 | 74.3 |
| 30 kph | $v_2$ | 75 | 80 | 81 | 70 | 77.0 |
| 60 kph | $v_3$ | 77 | 78 | 77 | 74 | 76.9 |

404

| | | $t_0$ | $t_1$ | $t_2$ | $t_3$ | $\mu_j$ |
|---|---|---|---|---|---|---|
| 0 kph | $v_0$ | 80 | 78 | 82 | 80 | 79.8 |
| 10 kph | $v_1$ | 75 | 78 | 77 | 69 | 75.4 |
| 30 kph | $v_2$ | 75 | 80 | 81 | 70 | 77.0 |
| 60 kph | $v_3$ | 77 | 78 | 77 | 74 | 76.9 |

406

| $w_0$ | $w_1$ | $w_2$ | $w_3$ |
|---|---|---|---|
| 0.35 | 0.30 | 0.20 | 0.15 |

METHOD AND SYSTEM OF QUANTIFYING AND MANAGING STEERING COMMAND-RESPONSE LATENCY FOR AN AUTONOMOUS VEHICLE

INTRODUCTION

The present disclosure generally relates to vehicles having autonomous driving systems, and more particularly to a method and system of quantifying and managing steering command-response latency for an autonomous vehicle.

Modern vehicles have intelligent systems, also referred to as smart systems, such as Advanced Driver Assistance Systems (ADAS) and/or Automated Driving Systems (ADS) that reside onboard the smart vehicle and are used to enhance or automate functions of various vehicle systems. Smart systems have one or more control modules that are in communication with vehicle sensors such as exterior sensors, interior sensors, and state sensors, as well as with various vehicle systems such as steering, acceleration, braking, and safety systems. The one or more control modules analyze information gathered by the vehicle sensors and send instructions, also referred to as commands, to the various vehicle systems for partial or full driving automation. Vehicles capable of partial or full driving automation are generally referred to as autonomous vehicles.

Due to various factors, an inherent amount of latency may exist between the time a control module issues a command to a vehicle system and the vehicle system completes a response to the command. While current smart systems achieve their objectives, there is a continued need for a method and system to quantify and manage inherent latency in command-response of vehicle systems, particularly steering systems, for autonomous driving.

SUMMARY

According to several aspects, a method of quantifying and managing steering command-response latency for an autonomous vehicle. The method includes autonomously driving a vehicle on a vehicle path; determining, in real-time, an average latency of steering command-responses for each of a plurality of predetermined vehicle velocities; determining a change in the vehicle path; determining an instant velocity in response to the determined change in the vehicle path; selecting a determined average latency having a predetermined vehicle velocity same as the instant velocity; issuing a steering command to negotiate the determined change in the vehicle path, wherein the steering command includes compensating for the selected determined average latency; and executing the steering command to negotiate the determined change in the vehicle path.

In an additional aspect of the present disclosure, the method further includes determining a current latency between issuing the steering command to negotiate the determined change in the vehicle path and executing the steering command; and including adding the determined current latency and determined instant velocity in determining, in real-time, the average latency of steering command-responses for each of the plurality of predetermined vehicle velocities.

In another aspect of the present disclosure, the method further includes determining one of the determined average latency of steering command-responses exceeding a predetermined value threshold; and initiating a vehicle health alert in response to the determined average latency of steering command-responses exceeding a predetermined value threshold.

In another aspect of the present disclosure, the determined average latency is a weighted average comprising a plurality of latencies determined over a period of time, wherein a more current determined latency includes a higher weight than a less current determined latency.

In another aspect of the present disclosure, the less current determined latencies above a predetermined number are deleted as more current latencies are determined.

In another aspect of the present disclosure, the predetermined velocities are one of a predetermined discrete velocities and a predetermined velocity ranges.

In another aspect of the present disclosure, the latency of a steering command-response is an amount of time elapsed between the control module issuing a control command for the steering system to achieve a requested steering angle and the steering system completing an achievement of executing the requested steering angle.

In another aspect of the present disclosure, the latency of a steering command-response is an amount of time elapsed between the control module issuing a control command for the steering system to achieve a requested steering angle and the steering system achieving the requested steering angle.

In another aspect of the present disclosure, at least one of the latencies of the steering command-responses is determined by utilizing a cross-correlation function.

According to several aspects, a method of quantifying and managing steering command-response latency for an autonomous vehicle is provided. The method includes a. autonomously driving a vehicle at a plurality of predetermined velocities; b. issuing a plurality of control commands to achieve respective commanded steering angles at each of the plurality of predetermined velocities; c. achieving the respective commanded steering angles in response to the plurality of control commands; d. determining a lag time between each of the issuing of the plurality of issued control commands to achieve respective commanded steering angles at each of the plurality of predetermined velocities and achieving the specific commanded steering angle; determining an average lag time for each of the plurality of predetermined velocities; and f. executing a control command to achieve a steering angle at one of the plurality of predetermined velocities, wherein the control command includes compensating for the determined average lag time corresponding to the one of the plurality of predetermined velocities. Determining the lag time comprises utilizing a cross-correlation function.

In an additional aspect of the present disclosure, averaging the determined lag times for each of the plurality of predetermined velocities comprises assigning a weight, wherein a most current determined lag time includes a higher weight than a lessor current determined lag time.

In another aspect of the present disclosure, averaging the determined lag times for each of the plurality of predetermined velocities includes averaging a predetermined number of current determined lag times.

In another aspect of the present disclosure, the predetermined number of current determined lag times are stored in a buffer, and excess determined lag times above the predetermined number are deleted from the buffer.

In another aspect of the present disclosure, the method further includes detecting a trigger condition; and initiating step b-e in response to the trigger condition.

According to several aspects, a computer readable medium comprising instructions stored thereon for quantifying and managing steering command-response latency for an autonomous vehicle is provided. The instructions upon execution by a processor, cause the processor to determine a trigger event, determine, in real-time, an average latency of steering command-responses for each of a plurality of predetermined vehicle velocities; determine a change in the vehicle path; determine an instant velocity in response to the determined change in the vehicle path; select a determined average latency having a predetermined vehicle velocity same as the instant velocity; issue a steering command to negotiate the determined change in the vehicle path, wherein the steering command includes compensating for the selected determined average latency; and execute the steering command to negotiate the determined change in the vehicle path. The determined average latency is a weighted average comprising a plurality of latencies determined over a period of time, wherein a more current determined latency includes a higher weight than a less current determined latency.

In an additional aspect of the present disclosure, the computer readable medium further includes instructions to cause the processor to determine one of the determined average latency of steering command-responses exceeding a predetermined value threshold; and initiate a vehicle health alert in response to the determined average latency of steering command-responses exceeding a predetermined value threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way

DETAILED DESCRIPTION

Figure 1:
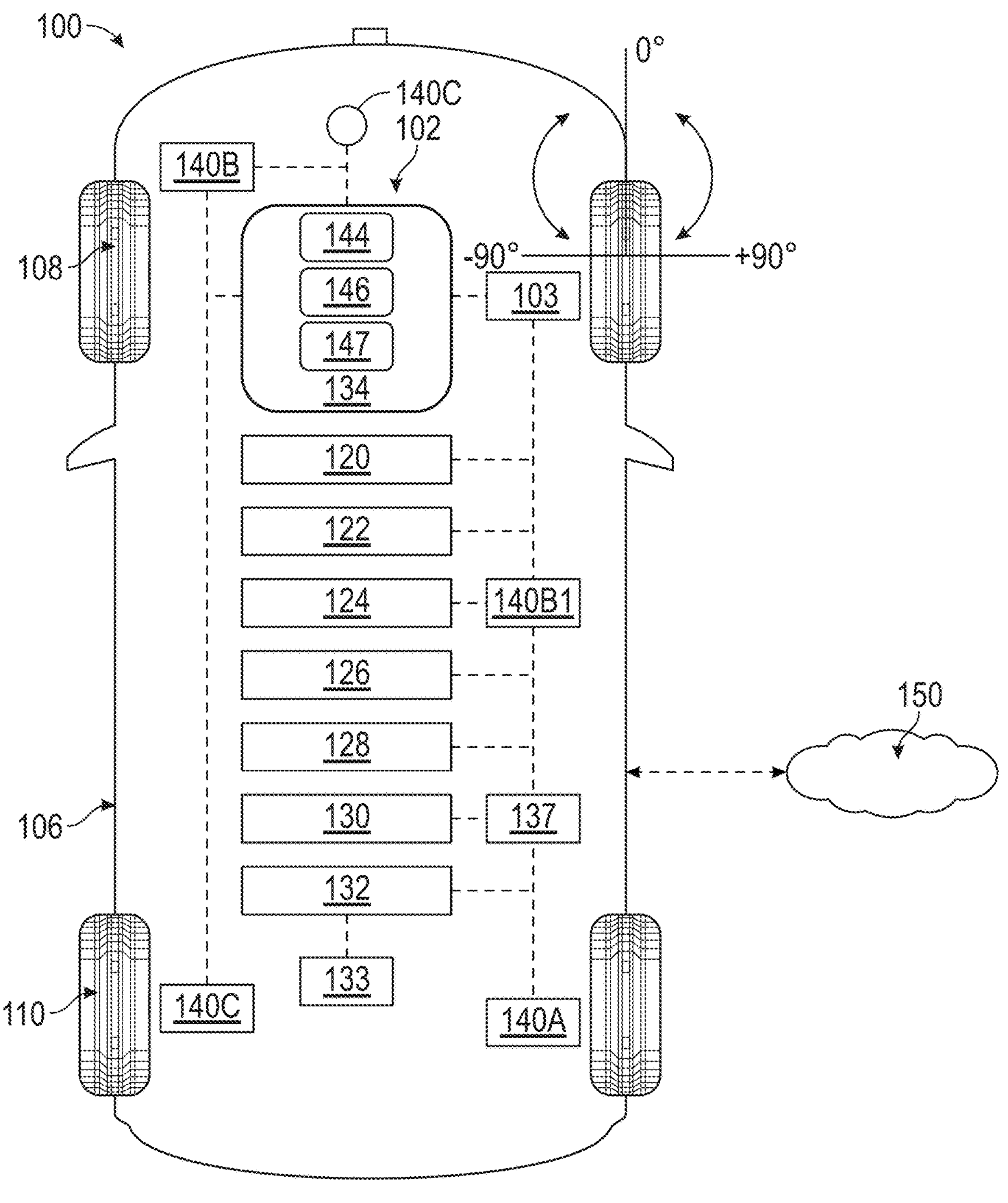
FIG. 1 is functional diagram of an intelligent vehicle having a system for quantifying and managing steering command-response latency, according to an exemplary embodiment.

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the terms module, component module, control module, or controller refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

The following disclosure provides a method and system of quantifying and managing steering command-response latency of autonomous vehicles, an example of which is described below. The method and system provides a real-time calculation and categorization of steering latency. The variability in steering latency may be the result of various factors such as loading on components (such as the steering rack) of the steering system, vehicle speed, cargo load distribution, and/or occupant positions within the autonomous vehicle. A failure to effectively quantify steering latency may result in undesirable vehicle oscillations. Effectively quantifying steering latency allows for path planning algorithms to accurately predict and manage the autonomous vehicle's trajectory, thereby reducing vehicle oscillations resulting in improved vehicle dynamics and occupant comfort.

FIG. 1 is a functional diagram of an autonomous vehicle 100, also referred to as vehicle 100, having an intelligent system 102, such as an Advance Driver Assistance System (ADAS) and/or an Automated Driving System (ADS), capable of operating from Level 0 (no driving automation) to Level 5 (full driving automation) in accordance with SAE J3016 levels of driving automation. The vehicle 100 generally includes a body 106, front wheels 108, and rear wheels 110. The body 106 substantially encloses the vehicle systems and components of the vehicle 100. The front wheels 108 and the rear wheels 110 are each rotationally coupled to the body 106 near a respective corner of the body 106. Although the connected vehicle 100 is shown as a sedan, it is envisioned that that connected vehicle 100 may be another type of on-road vehicle, such as a pickup truck, a coupe, a sport utility vehicle (SUVs), a recreational vehicle (RVs), and a motorcycle.

As shown, the vehicle 100 generally includes a propulsion system 120, a transmission system 122, a steering system 124, a brake system 126, a detection system 128, a vehicle communications system 130, and various vehicle actuators 132 for operating components of the vehicle systems 120, 122, 124, 126, 128, 130. The vehicle systems 120, 122, 124, 126, 128, 130 and actuators 132 are in communication with a vehicle control module 134, which is described in detail below. The vehicle 100 may also include a health manager 133 in communications with the control module 134 to monitor the health of the vehicle systems 120, 122, 124, 126, 128, 130 and notify the operator of any flagged systems via a human machine interface (HMI) 103.

The autonomous vehicle 100 includes a plurality of sensors 140A-140C configured to collect information and generate sensor data indicative of the collected information. The sensors 140A-140C may be removably or fixedly installed on the vehicle 100 and may be disposed in various arrangements to provide information to the vehicle control module 134. As non-limiting examples, the plurality of sensors 140A-140C include, but not limited to, navigation sensors 140A including Global Navigation Satellite System (GNSS) transceivers or receivers; vehicle state sensors 140B including yaw rate sensors, speed sensors, and wheel angle sensors 140B1; and external sensors 140C including cameras, lidars, radars, and ultrasonic sensors. The wheel angle sensors 140B1 is configured to detect a change in degrees of a wheel 108 controlled by the steering system 124. The wheel 108 is at 0 degree when the vehicle 100 is moving straight forward, and can change up to +/−90 degrees with respect to 0 degree.

The navigation sensors 140A are configured to detect the location and position of the vehicle 100. The external sensors 140C may have a field of detection large enough to detect and identify objects in front, in the rear, and in the sides of the autonomous vehicle 100. The external sensors 140C may actively or passively scan the vehicle environment for obstacles (including other vehicles, buildings, pedestrians, etc.), roadways, lane markings, signs, or signals.

The vehicle communication system 130 may include one or more communication transceivers 137 configured to wirelessly communicate information, or data, to and from other remote entities, such as other connected vehicles utilizing Vehicle-to-Vehicle (V2V) communication, infrastructure units such as Road-Side Units (RSU) and Mobile Edge Computing (MEC) utilizing Vehicle-to-Infrastructure (V2I) communications, and/or cloud computing service providers 150 utilizing telecommunications. The communication transceiver 137 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The intelligent system 102 includes a vehicle control module 134 in communication with one or more vehicle systems 120, 122, 124, 126, 128, 130, vehicle sensors 140A-140C, and vehicle actuators 132 using a Controller Area Network (CAN) and/or ethernet. The intelligent system 102 may also include a human machine interface (HMI) 103 for communicating with an occupant of the vehicle, such as an operator. In some embodiments including external source communication via the vehicle communications system 130, the vehicle control module 134 may receive information, such as map data, from external sources such as other smart vehicles, smart infrastructure (e.g., electronically communicating roadways, traffic signals, or parking structures), or other sources of relevant information. The gathered data is processed by the vehicle control module 134 to generate and send control commands to the various vehicle systems 120, 122, 124, 126, 128, 130 and actuators 132 for partial or full autonomous operation of the vehicle 100. The control commands may include instructions to quantify and manage latency in the command-response in certain vehicle systems, particularly the steering system 124.

The control module 134 includes at least one processor 144 and a non-transitory computer readable storage device or media 146. The non-transitory computer readable storage device or media 146 includes machine-readable instructions that when executed by the processor 144, causes the processors 144 to execute the Method 300 described below and to control the vehicle 100 in partial or full autonomous mode. The processor 144 may be a custom made or commercially available processor, a central processing unit (CPU), a graphics processing unit (GPU), an auxiliary processor among several processors associated with the control module 134, a semiconductor-based microprocessor (in the form of a microchip or chip set), a macro processor, a combination thereof, or generally a device for executing instructions. The vehicle computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The vehicle computer-readable storage device or media 146 of the control module 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the control module 134 in controlling the autonomous vehicle 100. The control module 134 may also include a buffer 147 configured to temporarily store data.

Figure 2:
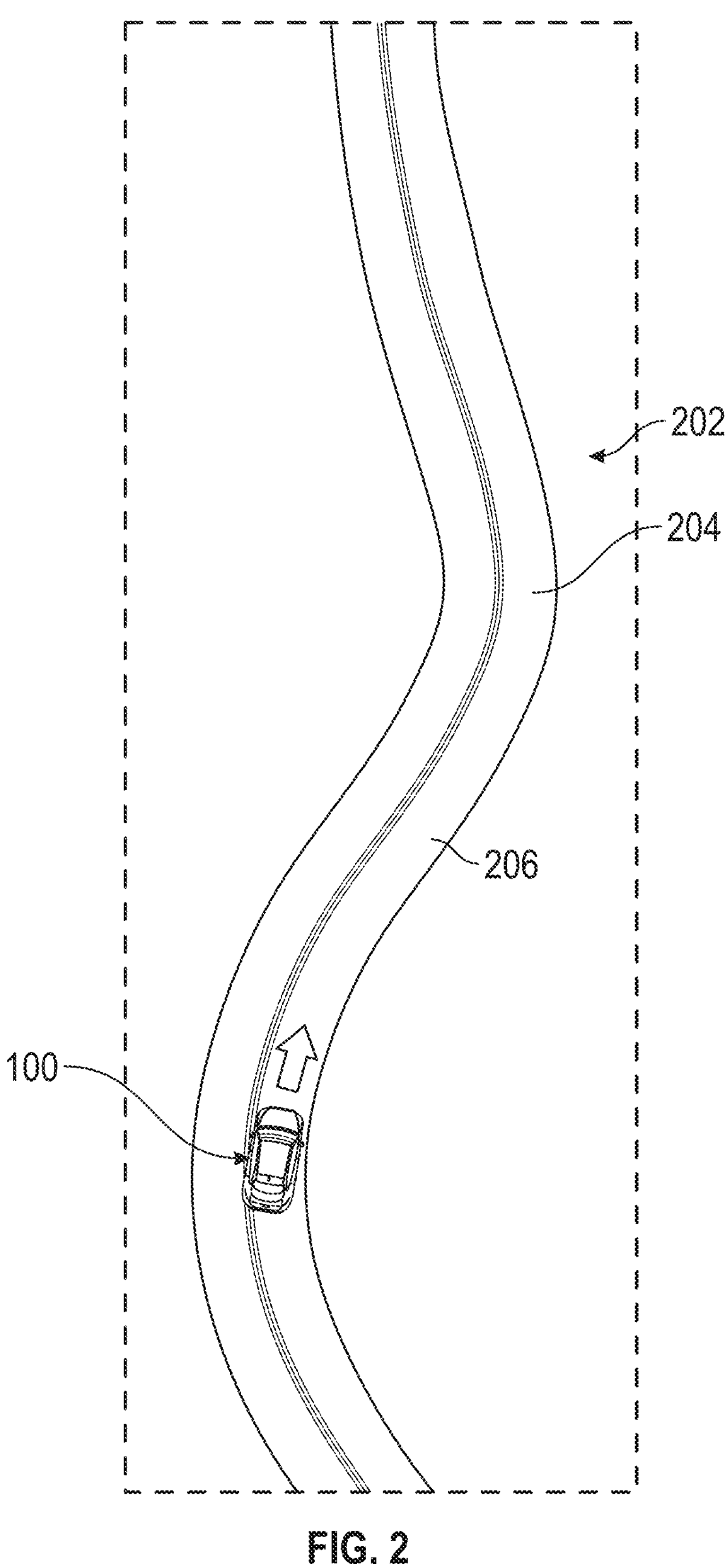
FIG. 2 is a plan view of an exemplary traffic scenario in which the intelligent vehicle of FIG. 1 is in autonomous operation, according to an exemplary embodiment.

FIG. 2 is an illustration of a non-limiting example of a traffic scenario in which the vehicle 100 is autonomously driven on a roadway 202 that includes various direction changes such as twist 204 and turns 206. The control module 134 receives data from the various vehicle sensors 140A-140C and processes the data to generate control commands for the vehicle systems to autonomously negotiate the direction changes defined by the roadway 202. The control module 134 may also receive map data and other information from off-board sources to supplement the sensor data for generating control commands to negotiate the roadway 202.

Figures 3, 4:
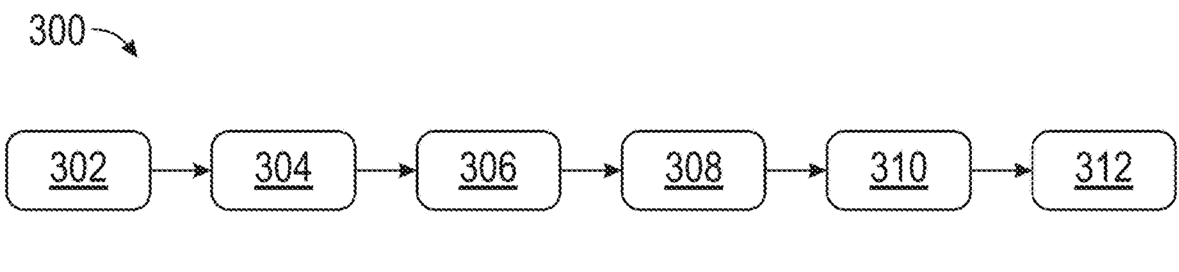
FIG. 3 is a block diagram of a method of quantifying and managing steering command-response latency, according to an exemplary embodiment.
FIG. 4 shows exemplary tables of steering command latencies correlated with predetermined vehicle velocities.

FIG. 3 is a block diagram of a method of quantifying and managing steering command-response latency for an autonomous vehicle 100, Method 300. Latency is defined as the lag time, the amount of time elapsed, between the control module 134 issuing a control command (i.e. request) for the steering system to achieve a requested steering angle and the steering system completing the achievement of executing the requested steering angle. The executed steering angle is also referred to as a response steering angle, a response angle, or a commanded angle. The Method 300 dynamically calculates, in real-time, the latency between the control command to achieve a steering angle and completing the achievement of executing the requested steering angle, in which the real-time calculated latency is a function of vehicle velocity. The calculated latency may also be weighted to account for the most current vehicle operating conditions. The Method 300 provides real-time continuous updates to the vehicle control module 134 in order to facilitate a more accurate path planning.

At Block 302, the vehicle 100 is autonomously driven on a route, also referred to as a vehicle path, defined by a roadway 202 detected by the vehicle sensors 140A-140C or map data stored onboard the vehicle computer-readable storage device 146. Autonomously driven means the vehicle 100 is operating in partial or full driving automation mode. The map data may be provided by an off-board remote source via the communications system 130. The route may also be defined by an operator entering waypoints on a HMI 103 such as an interactive map displayed on a touch screen monitor.

At Block 304, the control module 134 monitors the vehicle systems 120, 122, 124, 126, 128, 130 to detect a trigger condition such as a steering angle change greater than a predetermined threshold (+/−45 degrees or greater as a non-limiting example) within a recent time period (3 seconds as a non-limiting example) in responding to a control command issued by the control module 134 to achieve a requested steering angle. Upon detecting the trigger condition, the control module 134 records the instant velocity (v) of the vehicle 200 and determines a latency (t) of the steering system 124 in achieving the commanded steering angle. The control module computes the cross-correlation between the command signals and response signals and determines the latency (t) between the signals by finding the offset with the highest cross-correlation. A latency is determined for each instance a trigger condition is detected. If no trigger condition is detected, for example, the vehicle is driving in a straight line (e.g. the road wheels are not turning), there is no need or ability to determine the latency because the steering angle response will always match the control command, which is a 0 degree change. Block 304 is continuously repeated. The least current determined latencies above a predetermined threshold is ignored or deleted from storage memory.

At Block 306, the determined latencies having the same instant velocity are sorted or grouped together to provide a correlation between vehicle velocities and latency. In a non-limiting example, a predetermined number of determined latencies ($t_0$-$t_3$) and corresponding vehicle instant velocities ($v_0$-$v_3$) are shown tabulated in Table 402. The determined latencies are categorized in an order from the most current ($t_0$) to the least current ($t_3$) for each of the respective velocities ($v_0$-$v_3$). The predetermined number of recorded latencies and corresponding velocities may be stored in a memory buffer 147. The least current determined latencies beyond the predetermined number may be deleted from the memory buffer 147 or ignored.

At Block 308, the determined lag times ($t_0$-$t_n$) are averaged for each of the respective velocities ($v_0$-$v_n$). The average lag time ($\mu_j$) may be weighed, in which the more current lag time (e.g. $t_0$) is given a greater weight than the least current lag time (e.g. $t_n$). In a non-limiting example, Table 402 shows the predetermined number of lag time values to be from $t_0$ to $t_3$ and the selected vehicle velocities ($v_0$-$v_3$) are 0 kilometer per hour (kph), 10 kph, 30 kph, and 60 kph, respectively. In the example shown, the selected vehicle velocities are discrete velocities. It should be appreciated that the selected vehicle velocities ($v_0$-$v_3$) may be velocity ranges such as 0 to 10 kph, 11-20 kph, 31-40 kph, and 41-60, respectively, as a non-limiting example. Referring to Table 404, as a more current determined latency is entered under to, the earlier determined latencies ($t_1$-$t_3$) are shifted over one column until the least current determined latency is deleted off the table or memory buffer 147.

The determined latencies ($t_0$-$t_3$) may be given weighed values as shown in Table 406 of FIG. 4, with the most current determined latency $t_0$ given a higher weight value and the least current latency given a lower weight value. In a non-limiting example, referring back to Table 402, $t_0$ is given a weighted value of 0.35, $t_1$ is given a weighted value of 0.30, $t_2$ is given a weighted value of 0.20, and $t_3$ is given a weighted value of 0.15. The resulting average weighted lag time ($\mu$) corresponding to a vehicle velocity of 10 kph is 74.3 milliseconds (ms).

At Block 310, the control module 134 determines whether an average weighted lag time ($\mu_j$) corresponding to a particular vehicle velocity consistently exceeds a predetermined lag time threshold value. If so, the control module 134 sends a flag to the vehicle health manager 133 and/or HMI 103 to warn the operator that vehicle performance may be degraded, and that service may be required.

At Block 312, the control module 134 continues guiding the vehicle 100 on the roadway 202 and issues control commands to the various vehicle systems 120, 122, 124, 126, 128, 130, including current direction change steering control commands for the steering system to execute steering angle changes to negotiate the twists and turns of the roadway 202. To navigate these features, the control module 134 determines the vehicle current velocity at the time of issuing a steering control command and takes into consideration the calculated average weighted lag time ($\mu$) corresponding to the vehicle current velocity in issuing steering control commands. The steering control commands are calibrated in real-time in accordance with the calculated average weighted lag time ($\mu$) corresponding to the vehicle instant velocity in order to keep the vehicle on the prescribed route. The magnitude, rate, and timing of the control command is calculated based on the average weighted lag time ($\mu$) corresponding to the predetermined velocities. For example, if the lag time is much higher than usual, the control module 134 would compensate for the tag time by commanding the steering system to execute the steering control command earlier than it otherwise would have. Conversely, if the lag is shorter than usual, the control module 134 would compensate by delaying the steering control command.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of quantifying and managing steering command-response latency for an autonomous vehicle, comprising:

autonomously driving a vehicle on a vehicle path;

detecting a trigger condition, wherein the trigger condition includes detecting a steering angle change greater than a predetermined threshold;

calculating, in real-time, average latencies of steering command-responses as a function of predetermined vehicle velocities in response to the detected trigger condition;

determining a change in the vehicle path;

determining an instant velocity to negotiate the determined change in the vehicle path;

selecting a calculated average latency of steering command-responses corresponding to a predetermined vehicle velocity same as the determined instant velocity;

issuing a direction change steering command to negotiate the determined change in the vehicle path, wherein the direction change steering command includes compensating for a latency in executing the direction change steering command based on the selected calculated average latency; and executing the direction change steering command to negotiate the determined change in the vehicle path.

2. The method of claim 1, further comprising:

determining a current latency between issuing the direction change steering command to negotiate the determined change in the vehicle path and executing the direction change steering command; and including the determined current latency and the determined instant velocity in calculating, in real-time, the average latencies of steering command-responses as a function of predetermined vehicle velocities in response to the detected trigger condition.

3. The method of claim 1, further comprising:

determining one of the calculated average latencies of steering command-responses exceeds a predetermined value threshold; and initiating a vehicle health alert in response to the calculated average latencies of steering command-responses exceeding the predetermined value threshold.

4. The method of claim 1, wherein the plurality of predetermined vehicle velocities are predetermined discrete velocities.

5. The method of claim 1, wherein the plurality of predetermined vehicle velocities are predetermined velocity ranges.

6. The method of claim 1, wherein a latency of a steering command-response is an amount of time elapsed between a control module issuing a control command for a steering system to achieve a requested steering angle and the steering system completing an achievement of executing the requested steering angle.

7. The method of claim 1, wherein a latency of a steering command-response is an amount of time elapsed between a control module issuing a control command for a steering system to achieve a requested steering angle and the steering system achieving the requested steering angle.

8. The method of claim 1, wherein at least one of the latencies of the steering command-responses is determined by utilizing a cross-correlation function.

9. The method of claim 3, wherein the calculated average latencies of steering command-responses are weighted averages comprising a plurality of latencies determined over a period of time, wherein a more current determined latency includes a higher weight than a less current determined latency.

10. The method of claim 9, wherein less current latencies above a predetermined number are deleted as more current latencies are determined.

11. A method of quantifying and managing steering command-response latency for an autonomous vehicle, comprising:

a. autonomously driving a vehicle at a plurality of predetermined velocities;

b. detecting a trigger condition, wherein the trigger condition includes detecting a steering angle change greater than a predetermined threshold;

c. issuing a plurality of control commands to achieve respective commanded steering angles at each of the plurality of predetermined velocities in response to the detected trigger condition;

d. achieving the respective commanded steering angles in response to the plurality of control commands;

e. determining a lag time between each of the issuing plurality of control commands to achieve respective commanded steering angles at each of the plurality of predetermined velocities and achieving the respective commanded steering angles in response to the detected trigger condition;

f. determining an average lag time for each of the plurality of predetermined velocities;

g. executing a current control command to achieve a current steering angle at one of the plurality of predetermined velocities, wherein the current control command includes compensating for the determined average lag time corresponding to the one of the plurality of predetermined velocities;

h. determining an averaged lag time to be greater than a predetermined threshold; and i. issuing a warning in response to the averaged determined lag time being greater than the predetermined threshold.

12. The method of claim 11, wherein determining the lag time comprises utilizing a cross-correlation function.

13. The method of claim 12, wherein averaging the determined lag times for each of the plurality of predetermined velocities comprises assigning a weight, wherein a more current determined lag time includes a higher weight than a less current determined lag time.

14. The method of claim 13, wherein averaging the determined lag times for each of the plurality of predetermined velocities includes averaging a predetermined number of the more current determined lag times.

15. The method of claim 14, wherein the predetermined number of the more current determined lag times are stored in a buffer, and excess less current determined lag times above the predetermined number are deleted from the buffer.

16. A non-transitory computer readable medium comprising instructions stored thereon for quantifying and managing steering command-response latency for an autonomous vehicle, that upon execution by a processor, cause the processor to:

autonomously drive a vehicle on a vehicle path;

detecting a trigger condition, wherein the trigger condition includes detecting a steering angle change greater than a predetermined threshold;

determine, in real-time, an average latency of steering command-responses for each of a plurality of predetermined vehicle velocities in response to the detected trigger condition;

determine a change in the vehicle path;

determine an instant velocity in response to the determined change in the vehicle path;

select a determined average latency having a predetermined vehicle velocity same as the instant velocity;

issue a direction change steering command to negotiate the determined change in the vehicle path, wherein the direction change steering command includes compensating for the selected determined average latency; and execute the direction change steering command to negotiate the determined change in the vehicle path, wherein the determined average latency is a weighted average comprising a plurality of latencies determined over a period of time, wherein a more current determined latency includes a higher weight than a less current determined latency.

17. The non-transitory computer readable medium of claim 16, further comprising instructions to cause the processor to:

determine one of the determined average latency of steering command-responses exceeding a predetermined value threshold; and issue a vehicle health alert in response to the determined average latency of steering command-responses exceeding a predetermined value threshold.

* * * * *